(12) United States Patent
Bragg

(10) Patent No.: US 7,286,479 B2
(45) Date of Patent: Oct. 23, 2007

(54) ROUTING FOR A COMMUNICATIONS NETWORK

(75) Inventor: Nigel Bragg, Weston Colville (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1158 days.

(21) Appl. No.: 10/194,551

(22) Filed: Jul. 12, 2002

(65) Prior Publication Data

US 2003/0012145 A1    Jan. 16, 2003

Related U.S. Application Data

(60) Provisional application No. 60/306,210, filed on Jul. 13, 2001.

(51) Int. Cl.
   *H04J 1/16* (2006.01)
(52) U.S. Cl. ............... 370/238; 370/225; 709/238
(58) Field of Classification Search ............ 370/238, 370/230–236, 389, 237, 217, 221, 225; 709/238–242; 398/43, 58
   See application file for complete search history.

(56) References Cited

U.S. PATENT DOCUMENTS 6,981,055 B1 * 12/2005 Ahuja et al. ............. 709/238
7,075,927 B2 * 7/2006 Mo et al. ................. 370/389
2002/0141378 A1 * 10/2002 Bays et al. ............... 370/351

OTHER PUBLICATIONS

Rekhter Li: "A Border Gateway Protocol 4 (BGP 4) draft-ietf-idr-bgp4-12.txt" IEEE Draft Network Working Group, 'Online! Jan. 2001, XP002244288.
Bragg: "Routing Support for IPv6 Multi-homing" IETF Draft, 'Online! Nov. 2000, XP002244289.
Murata A Et Al: "A Routing Policy Description Language for Theinter-Domain Routing Protocol" Electronics and Communications in Japan, Part II—Electronics, Scripta Technica. New York, US, vol. 80, No. 6, part 2, May 1997, pp. 58-65, XP000830930.

* cited by examiner

Primary Examiner—John Pezzlo
(74) Attorney, Agent, or Firm—Barnes & Thornburg LLP

(57) ABSTRACT

For routing in a communications network, alternate paths to a destination are aggregated into a single composite route, prior to onward propagation of the route. Ideally, aggregation is performed at each point of route convergence in the network. Consequently, failure in only one of the paths does not then require that the composite route be withdrawn, and thus visibility of and reaction to the fault is restricted to parts of the network directly affected. The method is particularly applicable to border gateway protocols employed between Autonomous Systems as in, for example, the Internet.

24 Claims, 5 Drawing Sheets

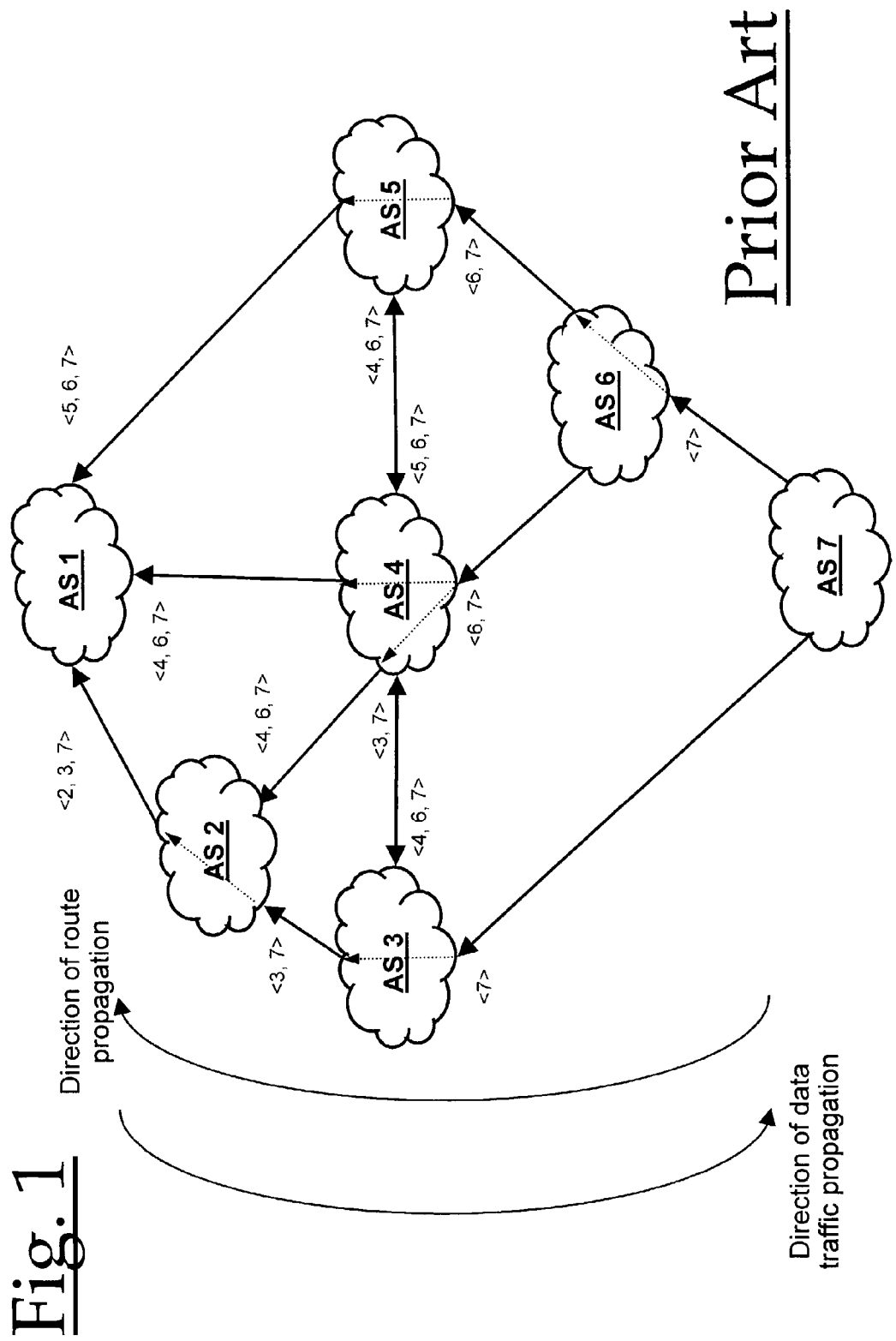

Fig. 2

| 20 | Each BGP speaker imports external routes, as a function of local Policy. |
|---|---|
| 21 | Each BGP speaker makes its own route selection, and communicates it if required to its internal BGP peers. |
| 22 | Each BGP speaker exports its selected route as dictated by local policy. |
| 23 | Each BGP speaker importing an external route which it has not selected as a result of its local route selection process:<br>• tests whether the imported route would be the one selected if its first choice of route was not available,<br>• communicates this route to its internal peers only if it would be the BGP speaker's second choice route. |
| 24 | A BGP speaker importing an external route at step 1 never exports a second choice route to that prefix on the external port on which the route was received; it just exports its first choice route if allowed (step 22) |
| 25 | For all external ports on which no routes to the prefix have been received, a BGP speaker makes its local selection of second choice route from the candidate set of second choice routes, and aggregates this with the first choice route to form a composite route for export as allowed by policy. This route thus replaces the route exported at step 3. above. |

ROUTING FOR A COMMUNICATIONS NETWORK

RELATED APPLICATIONS

This application is the full utility filing of U.S. Provisional Patent Application No. 60/306,210 filed on Jul. 13, 2001.

FIELD OF THE INVENTION

The present invention relates to methods, apparatus, software, and signals for effecting routing in a communications network and systems incorporating the same. The invention is of particular relevance to, but not limited to, inter-domain routing.

BACKGROUND TO THE INVENTION

Since its inception, the internet has grown at a rapid rate, typically at least doubling in size each year. This rapid growth continually brings to light new problems and limitations associated with changes in the manner and scale of communication.

The global Internet is a loose coalition of independently operated but interconnected constituent networks, known as autonomous systems (AS). Each autonomous system is responsible for its own customers, provision of services, pricing, and policies, but shares with other autonomous systems a common view of addressing and routing. In particular, routing between autonomous systems, by exchange of network level reachability information (NLRI, encoded as address prefixes), is established and maintained by means of a border gateway protocol (BGP).

BGP is the Internet's Network-Network Interface (NNI), and is the tool available to implement the commercial agreements between IP Service Providers. In general, every border router at the edge of an AS runs BGP:

external BGP sessions are maintained between each pair of directly connected border routers in adjacent AS's (external peers)

internal BGP sessions are maintained between all border routers belonging to the same AS; this logical full-mesh requirement is often implemented via Route Reflector(s)

At such peering points, the offer of routes is used to control the flow of traffic.

The essence of BGP operation can be captured by describing the behaviour following receipt of an update by a border router on a given AS, my_AS, from AS1234. This will have the form:

UPDATE(ASpath=<AS1234, AS5678>, NLRI={list of IP prefixes})

(this ignores volumes of other parameters)

This means that the IP address space defined by the list of IP prefixes is reachable by the path defined, namely ASpath.

The receiving border router in my_AS then decides whether it can and will use this route:

the route is discarded if there is a loop, determined by seeing my_AS's number in the path the route is discarded if disallowed by policy (eg I have a commercial agreement that traffic to AS5678 goes by another administration, not AS1234)

the route is not used if there is already a better route to those prefixes from my_AS A BGP speaker never propagates a route that it does not use itself.

Having decided to use an announced route, the receiving BGP speaker then:

1. installs the next hop (its external BGP peer) for that route in its own forwarding tables,
2. sends Updates to all its internal BGP peers (i.e. propagates the knowledge across its AS)
3. causes the route to be installed on all internal (non-border) routers within the AS, so that packets from anywhere within the AS will be routed to the correct border router. There are two ways:

injection of the prefixes as a special external link advertisement into the IGP (e.g. OSPF), or arranging that all routers in the backbone area are internal BGP speakers (even if they have no external connectivity), whereupon each can compute (using the IGP) the next hop towards the border router advertising a specific external route.

BGP speakers receiving a route from one of their internal peers in the same AS (step 2. above) must then decide whether to propagate this route to any of their external peers in adjacent AS's. Policy is again applied to make this decision (e.g. does my AS offer transit to my peer AS for traffic routed via AS1234?); if it is appropriate to advertise the route, the border router pre-pends its own AS number to the AS path (and modifies other parameters), and sends to each appropriate external peer an Update of the form:

UPDATE(ASpath=<my_AS, AS1234, AS5678>, NLRI={list of IP prefixes}).

Whilst a Border Gateway Protocol such as that described above provides an effective means of identifying routes between AS's, it suffers from the problem that under failure conditions, for example upon failure of any link between AS's or any border router which lies on a selected route, the route is withdrawn completely. Each AS previously having selected routes making use of the failed AS must then attempt to re-establish a new route from scratch, thereby causing significant routing traffic and loss of connectivity while alternative possible routes are determined. Furthermore, this effort to re-establish a route is required whether withdrawal of the failed AS is temporary (for example as a result of a system crash on that AS's nodes) or permanent (for example, the AS retires the node).

Historically, routing in the internet was hierachical. A small number (initially 1) of providers offered transit to local networks, and internet traffic was routed, by default, "upwards" in a local (e.g. national) hierarchy before being directed "across" to a relevant top-level gateway for onward transmission "downwards" to the ultimate recipient within that domain. Peering between local networks was rare.

Advent of commercial services and competition resulted in a proliferation of IP SPs, and an increasingly meshed network topology as commercial considerations lead to a massive increase in routing effected on a peer-to-peer basis between AS's. This, in turn, led to increasing size and complexity of the AS's local routing tables. This initial growth in routing table size was controlled by improved prefix aggregation permitted by Classless Interdomain Routing (CIDR), but has now resumed. The current growth of such "default-free" routing is once again stressing the capabilities of the Internet's BGP-4 protocol. ("Analyzing the Internet BGP Routing Table", Geoff Huston, 2001). This growth appears to have two major sources:

increased peering between Autonomous Systems, probably as a result of the falling cost of transport bandwidth compared with IP transit, an increase in the practice of end customers multi-homing onto multiple service providers (for resilience, cost and other reasons).

The net effect of this is that the largely hierarchical structure of the Internet, on which Classless Interdomain Routing (CIDR) was predicated, is evolving to a much more richly connected mesh. The address aggregation which CIDR was intended to allow is consequently undermined by prefixes being reachable from multiple (topologically distant) places.

Furthermore it has been observed that BGP is increasingly being used for traffic engineering, with "more specific" prefixes (typically defining subsets of a service provider's address allocation) being used to control the gateway at which an upstream provider is directed to inject traffic onto the service provider's network.

This might not be a major concern if the effect were limited to Internet Protocol Version 4 (IPv4) only; however, it now seems likely to be an issue with Internet Protocol Version 6 (IPv6) into the future. IPv6 originally envisaged an address allocation scheme supporting aggregation even more aggressive than CIDR, with a hierarchy of service providers each inheriting address allocations from their upstream provider (Provider Addressing). If an AS multi-homed, it would inherit an allocation from each upstream provider, and all hosts and routers were required to handle the resultant multiple addresses. Protocol support was provided to minimise (but could not eliminate) the pain of renumbering events when any AS in the food chain (below the top level) altered its connectivity to other AS's.

However, it seems very likely that this hierarchical provider addressing model will never be adopted by the service provider community itself, even if it is required by them of end customers. The reasons for this include the fact that, with the increase in meshed connectivity, it becomes difficult to define what constitutes a "default-free" service provider.

Consequently, it seems likely that IPv6 Service Providers will all obtain their address allocations from Registries, with likely minimal correlation between allocation and Internet topology. As a result it is to be expected that IPv6 routing table growth will follow the same pattern as IPv4 except in a much larger space.

It is not believed that the size of the routing table per se is the major problem. In the control plane, memory size is not a practical limitation, and it is believed that the growth in size of the forwarding table can be accommodated with modern longest match algorithms.

However, significant problems with the current scheme include:

the number of iterations (hence time) which can be taken by BGP-4 (in essence using a distance vector algorithm) to identify a new route following a failure resulting in withdrawal of the original choice, and the processing load resulting from the volume of Update messages which can be received in a short period (as a consequence of multiple instances of the above).

Both of these problems are caused at root by a "flat" routing architecture, with little route abstraction possible (because the address allocation made has minimal correlation with the inter-AS network topology); this not only has an adverse impact on the number of routing table entries, but also on their dynamics, because any failure causing a route to be withdrawn is seen across the entire network, and does not have its visibility limited by existing forms of aggregation.

Furthermore, there does seem to be a fundamental constraint on the solution space. Modern Link State routing technology is able to minimise the messaging required to communicate changes in network state (by use of a "node and link" abstraction, rather than explicit routes), and recent work shows that fast "convergence" can be achieved for large networks. The price paid for this, as pointed out in "Analyzing the Internet Routing Table", is Policy transparency across the entire network.

However, inter-domain Routing Policy is the only mechanism available to service providers to implement the commercial agreements they have made, and their overall business objectives, and some elements of these policies can be regarded as commercially sensitive. Therefore only those routing mechanisms supporting Policy opacity are likely to be commercially acceptable, and in practice this means using derivatives of BGP or similar protocol.

OBJECT OF THE INVENTION

The invention seeks to provide an improved method and apparatus for effecting routing (especially interdomain routing) in a communications network and a system incorporating the same.

SUMMARY OF THE INVENTION

The fundamental strategy is the aggregation of alternate paths to a given destination into a single composite route, prior to onward propagation of the route. Ideally, aggregation is performed at each point of route convergence in the network. The design intent is that a failure in only one of the paths embodied in the composite route does not then require that the composite route as a whole be withdrawn, and thus visibility of and reaction to the fault is restricted only to AS's directly affected.

This aggregation is thus quite different from the goal of traditional aggregation, which was the abstraction of a set of address prefixes into a single less specific prefix encompassing them all. As noted earlier, the traditional approach to aggregation cannot control table size or provide substantial abstraction, because of pseudo-random address allocations, and also fails to hide global propagation of route changes. This approach addresses the latter point, and makes the routing system more tolerant of multihoming and meshed connectivity.

In particular, according to a first aspect of the present invention there is provided a method of performing routing in a communications network comprising the steps of, at a routing node: receiving a plurality of routes to at least one destination address; aggregating a plurality of the routes into a single composite route prior to onward propagation of the composite route.

In a preferred embodiment, the plurality of the routes comprises: a first route selected according to first predetermined selection criteria as a most preferred route; a second route selected according to second predetermined selection criteria as a second most preferred route.

Preferably, the second predetermined selection criteria are the same as the first predetermined selection criteria as applied to the plurality of routes excluding the most preferred route.

In a further preferred embodiment, each node on any of the plurality of routes is represented only once in the representation of the composite route.

Preferably, divergence of the plurality of routes is represented only between the routing node and a first common point at which the plurality of routes converges.

In a further preferred embodiment, the step of aggregating takes place at each point of route convergence within the communication network.

According to a further aspect of the present invention there is provided a method of performing data forwarding in a communications network comprising the steps of, at a routing node: receiving a composite route representative of a plurality of routes to a given destination; selecting the composite route as a preferred route to the given destination; forwarding data traffic via the composite route; upon at least one, but not all, of the plurality of routes becoming unavailable, continuing to forward traffic to the given destination via the composite route.

In a preferred embodiment, the method additionally comprises the steps of: upon restoration of the one route, continuing to forward traffic to the destination via the composite route.

Preferably, the communications network is an autonomous system.

According to a further aspect of the present invention there is provided a method of performing automated routing at a routing node in a communications system comprising the steps of: importing representations of at least two distinct routes to at least one destination address; selecting representations of at least two of those distinct routes; pre-pending an indication of the routing node to a single composite representation of the selected representations to form a new composite representation; exporting the new composite representation.

Preferably, the steps of importing and exporting are to and from respective distinct autonomous systems.

In a further preferred embodiment, the node is a border gateway.

Preferably, the steps of importing and exporting employ a Border Gateway Protocol.

The invention also provides for apparatus arranged to perform the steps of the methods according to the present invention and comprising components for performing all the steps of the methods.

In particular, according to a further aspect of the present invention there is provided a communications network router comprising: a path aggregator arranged to receive representations of one or more paths to at least one destination network address and, where a plurality of those paths is received, to aggregate a plurality of the paths into a composite route for onward propagation.

The invention is also directed to a communications network comprising at least one such router.

According to a further aspect of the present invention there is provided a communications network router comprising: an input port arranged to receive a composite route representative of a plurality of routes to a given destination address; a processor arranged to select the composite route as a preferred route to the given destination; a data routing processor arranged to forward data via the selected composite routing.

The invention is also directed to a communications network comprising at least one such router.

According to a further aspect of the present invention there is provided a communications network comprising a router comprising: an input arranged to import representations of at least two distinct routes to at least one destination address; a processor arranged to select representations of at least two of those distinct routes, and to pre-pend an indication of the router's identity to a single composite representation of the selected representations to form a new composite representation; an output arranged to export the new composite representation.

The invention is also directed to a communications network comprising at least one such router.

The invention also provides for computer software in a machine-readable form and arranged so as, in operation, to perform the methods, individually or in combination, by which the invention operates.

In particular, according to a further aspect of the present invention there is provided software for a computer in a machine-readable medium and arranged to perform the steps of: receiving a plurality of paths to at least one destination; aggregating a plurality of the paths to the destination into a composite route for onward propagation.

The invention also provides for machine-readable signals generated by any of the methods or apparatus by which the present invention operates.

In particular, according to a further aspect of the present invention there is provided a signal in a communications network, comprising; a representation of a composite route to a given destination.

The invention also provides for machine-readable data structures generated by or used by any of the methods or apparatus by which the present invention operates.

In particular, according to a further aspect of the present invention there is provided data structure for representation of a composite route in a communications network, the composite route comprising a plurality of alternative routes, the data structure comprising: a first portion representative of an initial portion of the composite route common to each of the plurality of alternative routes; a second portion representative of a final portion of the composite route common to each of the plurality of alternative routes; a third portion representative of those portions of the composite route not common to each of the plurality of alternative routes.

At least one of the first portion and the second portion may be empty.

Advantageously, the present invention improves important aspects of routing behaviour, in particular inter-domain routing behaviour by:

reducing the visibility of faults throughout the network, and improving the speed of response to faults (i.e. selection and installation of a new rate).

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 1 shows an example of routing information propagation according to the prior art;

FIG. 2 shows an example of a routing method in accordance with the present invention;

DETAILED DESCRIPTION OF INVENTION

Figure 3:
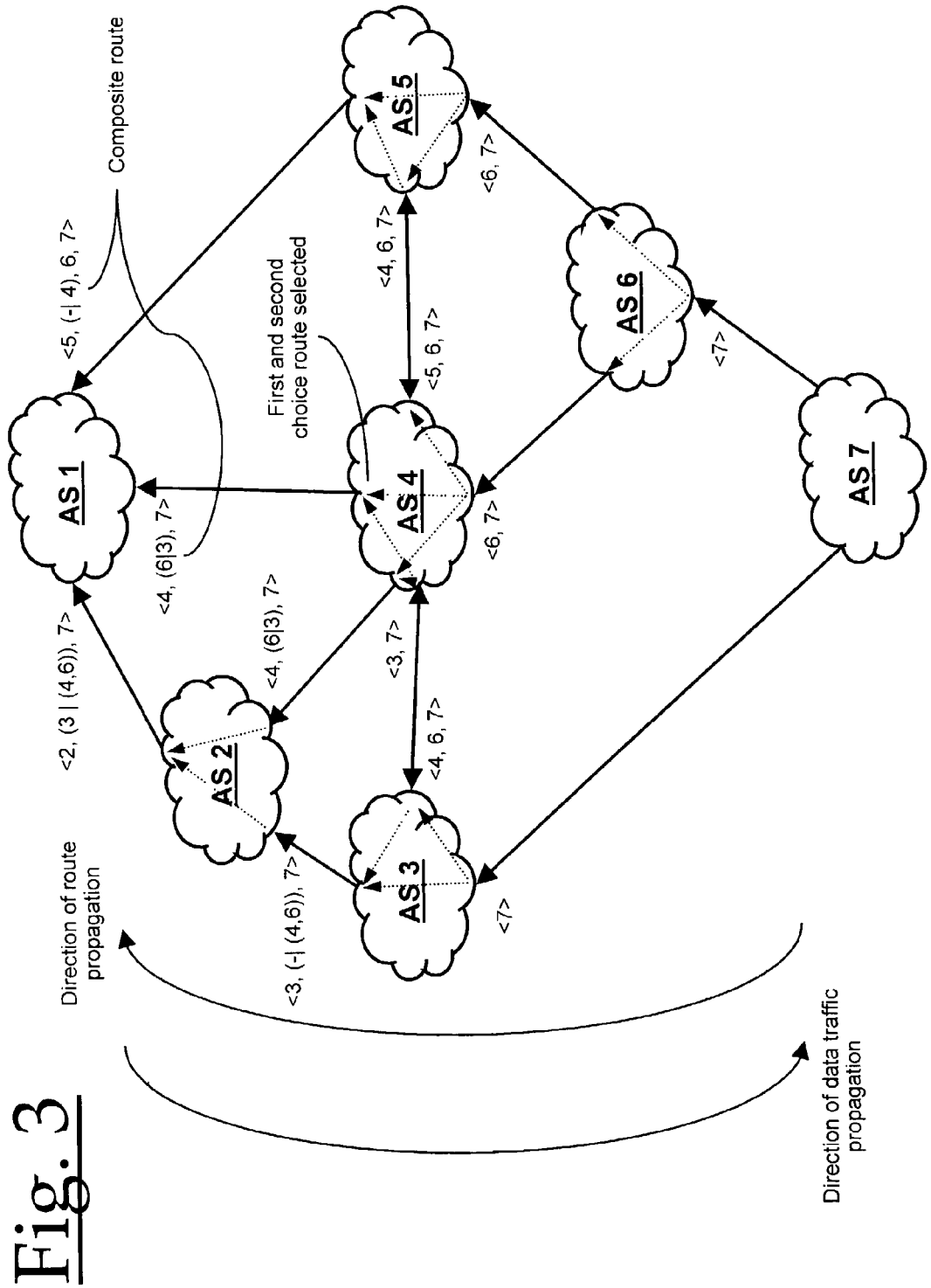
FIG. 3 shows an example of routing information propagation according to the present invention.

The next two sections address different aspects of the scheme:
  composite route generation and dissemination,
  behaviour under faults,
and a final section considers a separate fault notification issue
  the impact on fault reporting of path aggregation mechanisms.

Composite Route Generation and Dissemination

Referring to FIG. 2, it is now outlined how the composite routes can be generated, showing that this can be done by extension to BGP procedures, and how the routes are used. Some desirable extensions to BGP semantics are indicated.

From the perspective of a single AS, improved BGP speakers behave as follows:
1. each BGP speaker 20 imports external routes, as a function of local Policy, in the usual way.
2. each BGP speaker 21 makes its own route selection, and communicates it if required to its internal BGP peers, again in the usual way.
3. if it has only a single route available to it, each BGP speaker 22 exports its selected route as dictated by local policy, in the usual way. If multiple routes are available, export of the selected route may be deferred till step 6 below.

The composite route identification procedure now begins: p0
4. each BGP speaker 23 importing an external route which is not selected as a result of its local route selection process:
   a) tests whether the imported route would be the one selected if its first choice of route were not available, and
   b) communicates this route to its internal peers only if it would be the BGP speaker's second choice route.

Each BGP speaker (not itself importing an external route) now has a candidate set of possible second choice routes, received as a result of steps 2 and 4b above.
5. A BGP speaker 24 importing an external route to a set of IP prefixes at step 1 never exports a second choice route to that IP prefix on the external port on which the route was received; it just exports its first choice route if allowed (step 3) above. That is, a BGP speaker never exports a second-choice route back to the external source of its first-choice route.
   This is a key part of the method. Firstly, it ensures stability of the composite route calculation. Its other effect is to maintain distinct alternate routes where they exist, and so to avoid the unwanted rejection of routes by BGP's loop detection test when only one of the alternate routes would actually result in looping. Viewed another way, a BGP speaker importing an external route and receiving an internally advertised one lies by definition at a re-convergence point, and does not benefit from a second choice external route.
6. For all external ports on which no routes to the prefix have been received, a BGP speaker 25 makes its local selection of second choice route from the candidate set of second choice routes, and aggregates this with the first choice route to form a composite route for export as allowed by policy. This route thus replaces the route exported at step 3. above.

Informal syntax for the AS-path of this route at any point can be represented as:
  {ASsequence}, aggregatingAS,
  (1stChoiceAS-path|2ndChoiceAS-path),
  {ASsequence}, originAS where:
  the initial ASsequence, which may be null, describes the AS Path beyond the aggregation point (in the usual way),
  aggregatingAS is the AS generating the composite route (ie the AS at which the two routes re-converge),
  1st and 2nd ChoiceAS-paths define the alternate path segments of the composite route; each may be either an AS Sequence or an AS Set. It is not necessary to preserve the full path structure, and when forming a composite route which includes a route that is itself composite, the latter may be simplified with the alternate AS-path segments aggregated into an AS Set. It is essential that every AS in the composite path is listed, for loop avoidance and possibly also for policy reasons. This is because the export of the composite route by the aggregating AS is intended to enable the aggregating AS to use either path at its own discretion, without informing upstream importers of the route.
  the later ASsequence (which may be null) is the AS Sequence describing the route from the origin AS up to the AS where the alternate path segments of the composite route diverge, and
  originAS is just that and may, if dual-homed, also be the point at which route divergence occurs.

In the network of FIG. 3, application of these rules results in the AS-paths shown being generated for a set of prefixes within AS7, if no Policy is applied. The direction of the arrows indicates the direction in which the aggregate routes are exported.

Figure 4:
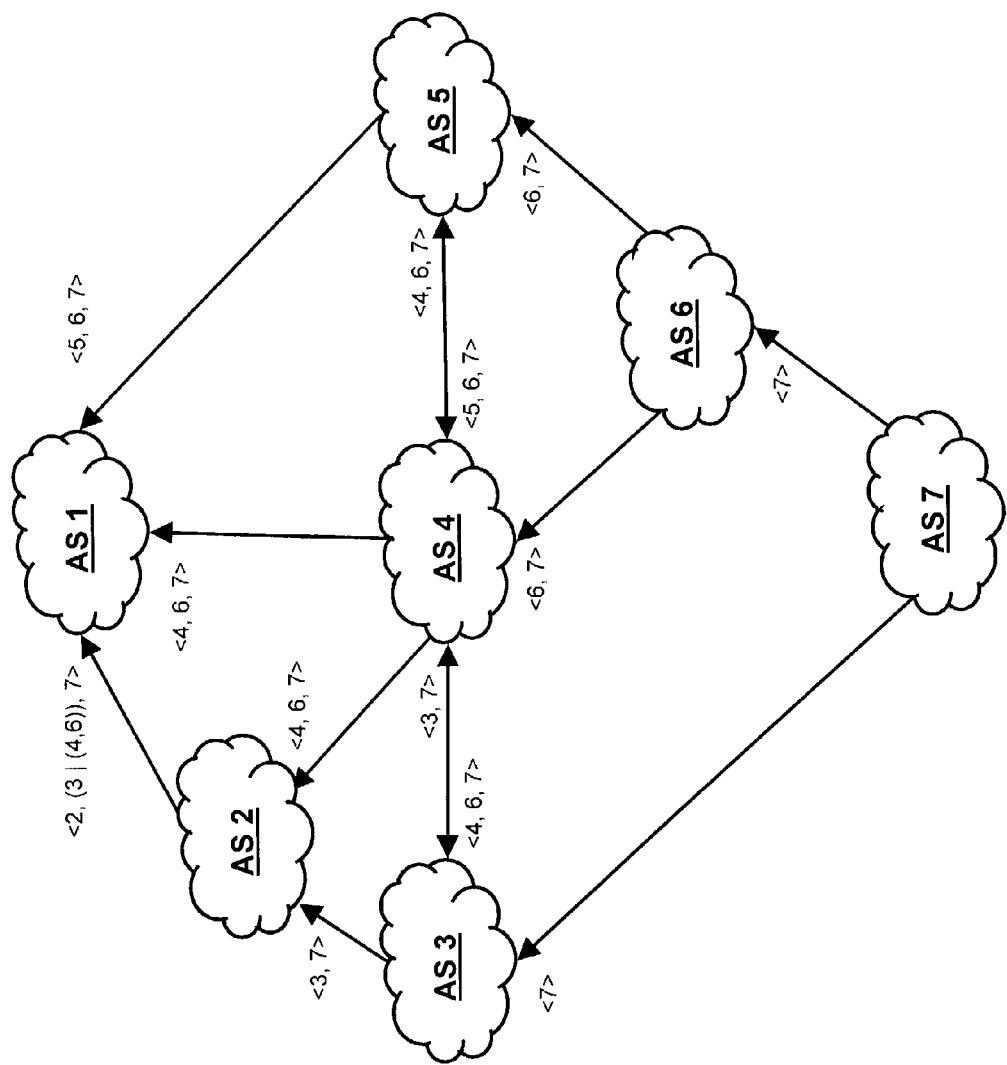
FIG. 4 shows a further example of routing information propagation according to the present invention.

However, referring to FIG. 4, if for example the connections between AS4 and AS3 and AS5 are private peerings, Policy would be applied in the conventional way and the routes offered by AS4 would not advertise routes via AS3 and routes offered by AS3 and AS5 would not include references to routes via AS4.

Figure 5:
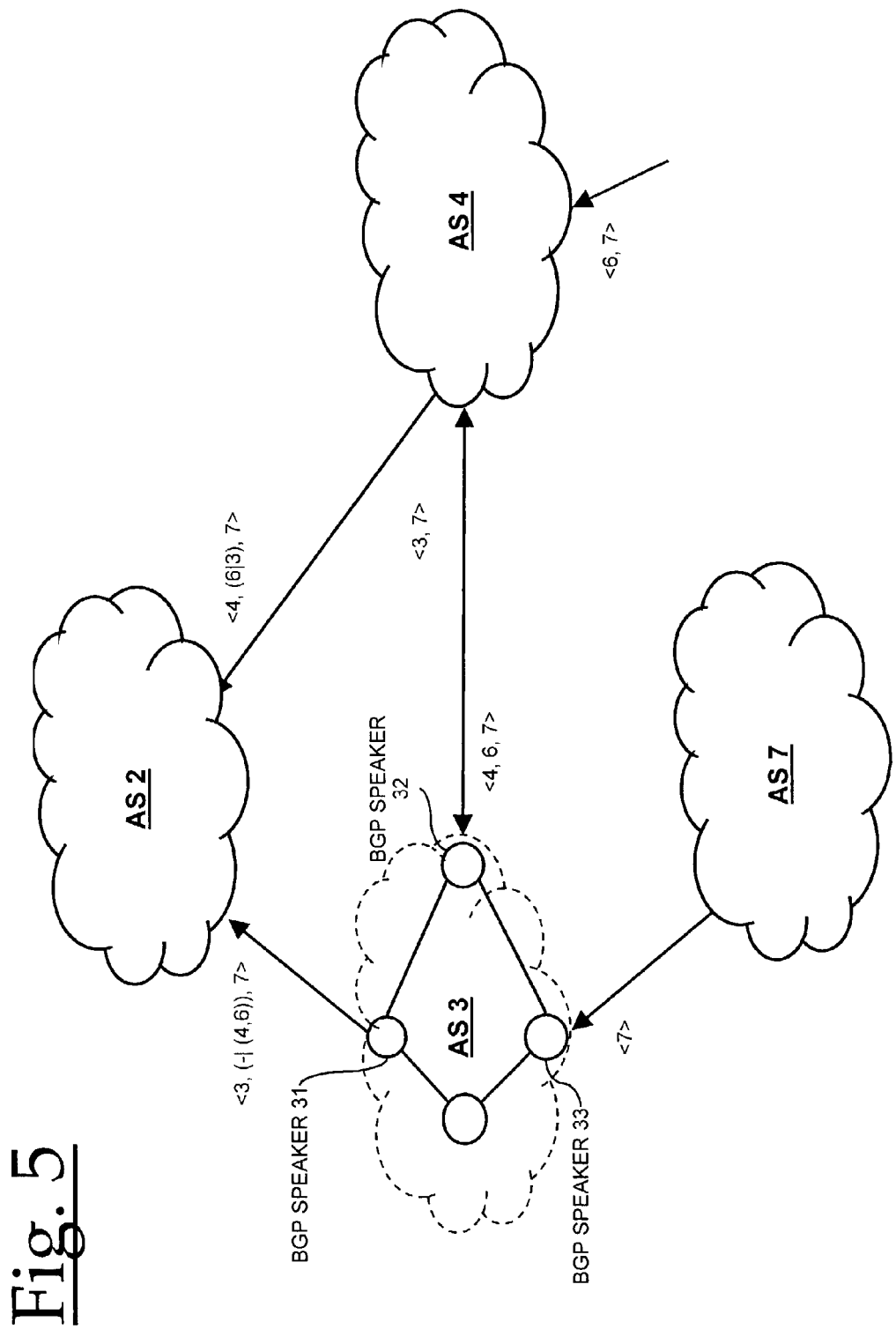
FIG. 5 shows a further example of routing information propagation according to the present invention.

FIG. 5 shows in more detail a portion of the network of FIG. 2, showing how a given AS, AS3, may comprise a network of BGP peers 31-33 internal to the AS, and each link to an external BGP peer in another AS.

Behaviour Under Faults

The objective of this strategy is fault masking, and it is inherent in this that state about faults will be held in the network. For this reason, it is desirable to make the semantics of WITHDRAWN within BGP-4 richer, as follows:
  WITHDRAWN is reserved for deliberate administrative withdrawal of a route, with the intention that it will not be reinstated,
  UNAVAILABLE is used to denote that a route is currently not operational, but with the implication that this is expected to be a transient state, and restoration may reasonably be expected at some time in the future Thus a BGP speaker detecting the unexpected failure of a session with a peer defaults to announcing all affected routes as UNAVAILABLE to its remaining peers. It will be necessary to define a timeout period (preferably with a default duration in the order of hours, not minutes) after which a BGP speaker should give up on an UNAVAILABLE route, declare it WITHDRAWN, and propagate the consequences on any composite routes which included it.

The behaviour under fault now becomes comparatively straightforward
  a BGP speaker using an imported route which is declared UNAVAILABLE, and not having a second choice route, propagates the UNAVAILABLE update to all peers to whom the route was exported.

a BGP speaker importing a route which it is using as its first choice component of a composite route and which is declared UNAVAILABLE:
  installs its second choice route for forwarding locally
  propagates the UNAVAILABLE indication on those ports on which it was exporting only its first choice route (step 5 earlier)
  gives no indication of the failure of the first choice route on those ports on which it was exporting the composite route If a BGP speaker receives a WITHDRAWN update for a route of either kind, it must reprocess its routing choice for the affected prefixes as described earlier.

So, for an example based once again on the network of FIG. 3, if there is a fault in the link between AS3 and AS7, only AS3 responds. AS3's offer to AS4 is UNAVAILABLE, but the composite offer to AS2 (incorporating AS-path AS3,AS4,AS6,AS7) is maintained. By contrast, the same fault in FIG. 4 is propagated differently, because of the private peering between AS3 and AS4; now AS3's offer to AS2 is also UNAVAILABLE, so AS2 switches to the route via AS4, but does not need to alter its composite offer to AS1.

Impact on Fault Reporting of Route Aggregation Mechanisms

In the description of composite route generation and dissemination above, it is stated that it is not necessary to preserve the full nested path structure as composite routes are aggregated with composite routes. However, some care in the representation of aggregation is necessary. Consider again the arrangement of FIG. 3.

AS2 is offered <3,(–|(4,6)),7> (where "–" indicates a null link, so that the composite path denotes alternative paths <3,7> and <3,4,6,7>) and <4,(6|3),7>. The arbitrary aggregation of this into a composite route with the use of an AS Set to abstract the constituent alternate paths could result, for example, in the composite route:

<2,((3,4,6)|(4,6,3)),7> which does not apparently contain diverse paths below AS2: rather, both alternatives are dependent upon the same AS's, namely 3,4, and 6, albeit in differing orders.

However, it is apparent that of the four possible "raw" paths available when the constituent composite routes are expanded, two (<3,7> and <4,6,7>) are diverse above AS7 and are a suitable pair to form the basis of a composite route advertisement by AS2. This basic pattern is characteristic of any structure which offers a pair of diverse paths with additional connectivity between constituent AS's on each path.

Under the present practice of route announcement and withdrawal, the issue above should be irrelevant; importers of AS2's announcements do not need accurate diversity information, they just require a composite AS list from all paths covered. They accept AS2's routes as advertised, and expect to be protected from single-path UNAVAILABLE indications on such routes.

However, the present practice of route announcement and withdrawal is probably not the most efficient that can be created; in particular, failure of the link between routers which are external peers requires all the routes using it to be withdrawn by prefix enumeration. It can be seen, however, that each AS is actually able to build up a locally valid link-state database as routes are announced; this database is the Policy-filtered view of the true connectivity. "Link-state -like" announcement of failure can then be used to withdraw (or make unavailable) routes in a block.

For the purpose of this aggregation method, this is a significant issue because an AS which exports a composite route can no longer guarantee to suppress all failure indications affecting that route.

For example, if in the arrangements of FIG. 2 or 3, AS6 did not provide transit for some of AS7's prefixes, under failure of the AS3-AS7 link this unavailability would have to propagate beyond AS2 (because there is no alternate path for those prefixes). This then requires that adequate topology information be maintained in the composite route announcement to allow a recipient to determine whether a failure in a path component does actually jeopardise the route. The representation defined earlier makes the required topology information available explicitly. A convention that the construct <ASx, (AS-list), Asy> guarantees diverse paths between Asx and Asy also provides the information, but could be ambiguous under multiple faults.

Whilst the invention has been described above in terms of border gateway protocols between AS's, it will be apparent to those skilled in the art that the routing principles involved are not limited to that application but may also be applied to the dissemination and use of routing information between nodes (of various levels of abstraction, including regarding AS's as nodes) in a communications network.

Any range or device value given herein may be extended or altered without losing the effect sought, as will be apparent to the skilled person for an understanding of the teachings herein.

The invention claimed is:

1. A method of propagating routes in a communications network comprising a plurality of interconnected autonomous systems 'ASs', each AS having a number of border routing nodes, the method comprising the steps of, at a border routing node of a first AS:
  receiving path update messages identifying a plurality of paths from an originating address in said first AS to a destination address in a second AS, where some of said paths converge to pass through at least one other AS intermediate said first and second ASs;
  aggregating at least two of said converging paths into a single composite route; and
  transmitting an update message from said first border routing node to other border routing nodes in the communications network by way of propagating the composite route to said other border routing nodes.

2. The method according to claim 1 in which the plurality of paths comprises:
  a first path selected according to first predetermined selection criteria as a most preferred route;
  a second path selected according to second predetermined selection criteria as a second most preferred route;
  wherein said first and second paths converge to pass through said at least one other intermediate AS and said first and second paths are aggregated to form said composite route.

3. The method according to claim 2 in which the second predetermined selection criteria are the same as the first predetermined selection criteria as applied to the plurality of paths excluding the first path as the most preferred route.

4. The method according to claim 1 in which each border routing node of ASs on any of the at least two converging paths is represented only once in the representation of the composite route.

5. The method according to claim 4 in which divergence of the at least two converging paths is represented only between the first border routing node and a first common point at which the at least two converging paths converge.

6. The method according to claim 1 in which the step of aggregating takes place at each point of route convergence within the communications network.

7. The method according to claim 1, wherein said border routing nodes employ a Border Gateway Protocol 'BGP' to transmit update messages.

8. A method of performing forwarding of traffic data in a communications network comprising a plurality of interconnected autonomous systems 'ASs', each AS having a number of border routing nodes, the method comprising the steps of, at a border routing node of one of said ASs:
receiving an update message identifying a composite route representative of a plurality of paths from an originating address in the communications network to a destination address in said communications network, said composite route comprising an aggregation of at least two of said plurality of paths which converge to pass through at least one AS intermediate an originating AS and a destination AS;
selecting the composite route as a preferred route to the destination address;
forwarding traffic data towards the destination address via the composite route; and
upon one of the at least two converging paths of the composite route becoming unavailable, continuing to forward traffic data to the destination address via the composite route on the other of the at least two converging paths.

9. A method according to claim 8 additionally comprising the steps of;
upon restoration of said one of the at least two converging paths of the composite route that became unavailable, continuing to forward traffic data to the destination via the composite route.

10. The method according to claim 8, wherein said border routing nodes employ a Border Gateway Protocol 'BGP' to transmit update messages.

11. A communications network comprising a plurality of interconnected autonomous systems 'ASs', each AS having a number of border routing nodes, each border routing node comprising:
means for receiving path update messages identifying a plurality of paths from an originating address in a first AS to a destination address in a second AS, where some of said paths converge to pass through at least one other AS intermediate said first and second ASs;
means for aggregating at least two of said converging paths into a single composite route; and
means for transmitting an update message from said first border routing node to other border routing nodes in the communications network by way of propagating the composite route to said other border routing nodes.

12. The communications network according to claim 11 in which the plurality of paths comprises:
a first path selected according to first predetermined selection criteria as a most preferred route;
a second path selected according to second predetermined selection criteria as a second most preferred route;
wherein said first and second paths converge to pass through said at least one other intermediate AS and said first and second paths are aggregated to form said composite route.

13. The communications network according to claim 12 in which the second predetermined selection criteria are the same as the first predetermined selection criteria as applied to the plurality of paths excluding the first path as the most preferred route.

14. The communications network according to claim 11 in which each border routing node of ASs on any of the at least two converging paths is represented only once in the representation of the composite route.

15. The communications network according to claim 14 in which divergence of the at least two converging paths is represented only between a first border routing node and a first common point at which the at least two converging paths converge.

16. The communications network according to claim 11 in which aggregating takes place at each point of route convergence within the communications network.

17. The communications network according to claim 11, wherein said border routing nodes employ a Border Gateway Protocol 'BGP' to transmit update messages.

18. A communications network comprising a plurality of interconnected autonomous systems 'ASs', each AS having a number of border routing nodes, each border routing node comprising:
means for receiving an update message identifying a composite route representative of a plurality of paths from an originating address in the communications network to a destination address in said communications network, said composite route comprising an aggregation of at least two of said plurality of paths which converge to pass through at least one AS intermediate an originating AS and a destination AS;
means for selecting the composite route as a preferred route to the destination address;
means for forwarding traffic data towards the destination address via the composite route; and
means for continuing to forward traffic data to the destination address via the composite route on the other of the at least two converging paths upon one of the at least two converging paths of the composite route becoming unavailable.

19. A communications network according to claim 18, wherein each border routing node is configured to continue to forward traffic data to the destination via the composite route upon restoration of said one of the at least two converging paths of the composite route that became unavailable.

20. The communications network according to claim 18, wherein said border routing nodes employ a Border Gateway Protocol 'BGP' to transmit update messages.

21. A border routing node for a communications network comprising a plurality of interconnected autonomous systems 'ASs', each AS having a number of border routing nodes, said border routing node comprising:
means for receiving path update messages identifying a plurality of paths from an originating address in a first AS to a destination address in a second AS, where some of said paths converge to pass through at least one other AS intermediate said first and second ASs;
means for aggregating at least two of said converging paths into a single composite route; and
means for transmitting an update message from said first border routing node to other border routing nodes in the communications network by way of propagating the composite route to said other border routing nodes.

22. A border routing node for a communications network comprising a plurality of interconnected autonomous systems 'ASs', each AS having a number of border routing nodes, said border routing node comprising:
- means for receiving an update message identifying a composite route representative of a plurality of paths from an originating address in the communications network to a destination address in said communications network, said composite route comprising an aggregation of at least two of said plurality of paths which converge to pass through at least one AS intermediate an originating AS and a destination As;
- means for selecting the composite route as a preferred route to the destination address;
- means for forwarding traffic data towards the destination address via the composite route; and
- means for continuing to forward traffic data to the destination address via the composite route on the other of the at least two converging paths upon one of the at least two converging paths of the composite route becoming unavailable.

23. A computer readable medium storing program code means executable by a processor of a computing device in a communications network comprising a plurality of interconnected autonomous systems 'ASs', each AS having a number of border routing nodes, said program code means comprising:
- code for receiving path update messages identifying a plurality of paths from an originating address in a first AS to a destination address in a second AS, where some of said paths converge to pass through at least one other AS intermediate said first and second ASs;
- code for aggregating at least two of said converging paths into a single composite route; and
- code for transmitting an update message from said first border routing node to other border routing nodes in the communications network by way of propagating the composite route to said other border routing nodes.

24. A computer readable medium storing program code means executable by a processor of a computing device in a communications network comprising a plurality of interconnected autonomous systems 'ASs', each AS having a number of border routing nodes, said program code means comprising:
- code for receiving an update message identifying a composite route representative of a plurality of paths from an originating address in the communications network to a destination address in said communications network, said composite route comprising an aggregation of at least two of said plurality of paths which converge to pass through at least one AS intermediate an originating AS and a destination AS;
- code for selecting the composite route as a preferred route to the destination address;
- code for forwarding traffic data towards the destination address via the composite route; and
- code for continuing to forward traffic data to the destination address via the composite route on the other of the at least two converging paths upon one of the at least two converging paths of the composite route becoming unavailable.

* * * * *